Sept. 11, 1962  D. K. EARLEY  3,053,035
EDGING ATTACHMENT FOR ROTARY TYPE LAWN MOWER
Filed April 14, 1960
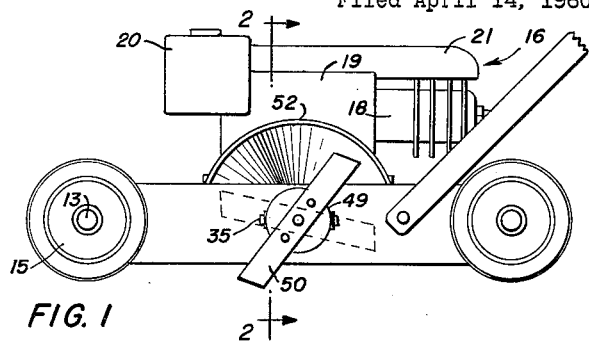
FIG. 1
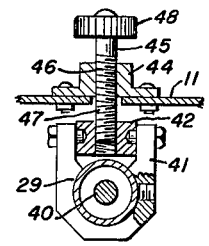
FIG. 4.
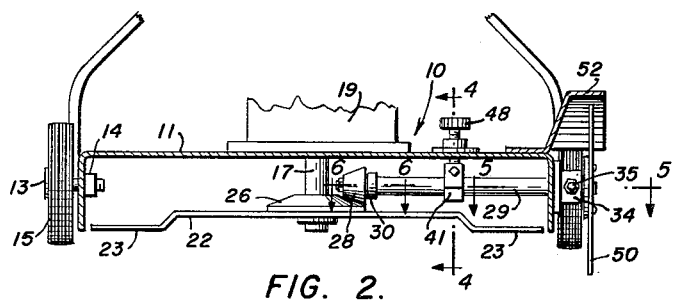
FIG. 2.
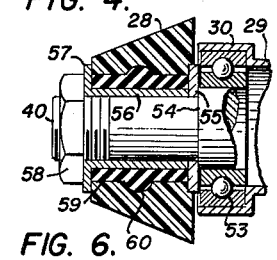
FIG. 6.
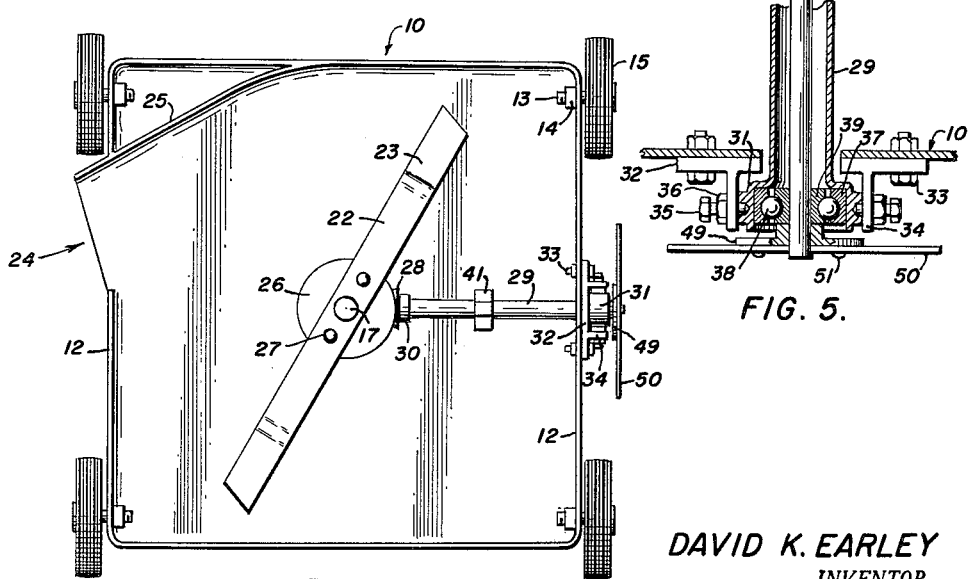
FIG. 5.
FIG. 3.
DAVID K. EARLEY
INVENTOR.
BY *Herbert J. Brown*
ATTORNEY

United States Patent Office 3,053,035
Patented Sept. 11, 1962

3,053,035
EDGING ATTACHMENT FOR ROTARY
TYPE LAWN MOWER
David K. Earley, 413 Harmon Road, Hurst, Tex.
Filed Apr. 14, 1960, Ser. No. 22,337
1 Claim. (Cl. 56—256)

This invention relates to lawn trimming equipment and has reference to an edging machine particularly adapted for attachment to a rotary type lawn mower.

Growth of the suburban population in this country has been accompanied by the widespread sale and use of power operated lawn and garden tools. Rotary mowers, so called because they consist primarily of a cutting blade which is rotated at high speed in a horizontal plane to cut a trimming swath through overgrown grass, have met public favor because of their inherent simplicity. While many makes and models of rotary mowers have been manufactured and sold, most of the machines now in use have a number of structural features in common. These are: a vertical shaft transmitting rotive force from a motor to a cutting blade, a carriage mounted on wheels and supporting its motor, a peripheral skirt to shield the operator from the spray of cut grass, and a handle by which the operator propels or guides the machine.

It is well known that a small cutting blade rotated in a vertical plane makes an excellent edger for severing an overgrowth of grass from the edges of sidewalks, curbs, flower beds, and the like, but the need for a separate motor and frame has been a deterrent to commercial success of this auxiliary tool. Heretofore, adaptations of edgers for attachment to mowers have not been entirely satisfactory because they generally required a major alteration of the mower or, because means for obtaining positive frictional engagement to operate the edger from the shaft of the mower was difficult to maintain without such alteration. The difficulty of making an edger suitable for attachment to any of a variety of mowers has previously been a further deterrent to commercial success.

An object of the invention is to provide an edger adapted to derive rotive force from a rotary lawn mower.

Another object of the invention is to provide an edger adapted for attachment to rotary mowers of various designs and dimensions.

A further object of the invention is to provide drive transmission means whereby an edger frictionally receiving rotive power from a lawn mower will not tend to lose such frictional engagement when resistance is encountered by the edger blade.

A particular object of the present invention is to provide adjustable means for positively engaging or disengaging power transmission members of a lawn mower and an attached edger.

An additional object of the invention is to provide convenient and accessible means for engaging or disengaging the power transmission system of a rotary mower.

These and other objects will become apparent from the following description and the accompanying drawing, wherein:

FIGURE 1 is a side elevational view of the invention attached to a lawn mower.

FIGURE 2 is a transverse sectional view of the invention taken on line 2—2 of FIGURE 1.

FIGURE 3 is a bottom view of the invention attached to the lawn mower of FIGURES 1 and 2.

FIGURE 4 is a partially sectional side elevational view of a hanger and associated parts of the invention taken on line 4—4 of FIGURE 2.

FIGURE 5 is a partially sectional plan view of the outer bearing assembly and edger blade of the invention taken on line 5—5 of FIGURE 2.

FIGURE 6 is a partially sectional plan view of the inner bearing assembly and driven cone assembly taken on line 6—6 of FIGURE 2.

In the drawing, a chassis, generally designated by the numeral 10, consists of an elevated rectangular plate 11 disposed parallel with the ground and a peripheral skirt 12 depending from the edges thereof. At opposite sides of the chassis 10 axle pins 13 project interiorly through the skirt 12 near the corners of the chassis and threadedly engage nuts 14 secured to the interior surface of the skirt. Wheels 15 are journaled on the axle pins 13 exteriorly of the chassis 10 and the lower surface of each wheel extends to a level beneath the lower edge of the skirt 12 so that the chassis is movably supported. An internal combustion engine 16 is supported on the upper side of the plate 11 and is there positioned with its crankshaft 17 projecting perpendicularly downward through an opening in the approximate center of the rectangular plate 11. With the crankshaft 17 so disposed, the cylinder 18 of the engine 16 projects rearwardly of the engine's crankcase 19 (as shown in FIGURE 1) and a fuel tank 20 and shield 21 are attached to the upper surface of the crankcase.

A mower blade 22 is perpendicularly secured to the lower end of a crankshaft 17 and the outer ends 23 of the mower blade are horizontally disposed at a level beneath the central portion of the blade to permit cutting at a level considerably beneath the lower end of the shaft 17.

An exhaust port 24 may be provided through the skirt 12 at one side of the chassis 10 and a deflection plate 25 may be constructed interiorly of the chassis to guide cuttings impelled by the blade 22 to the port.

A truncated drive cone 26 is coaxially attached to the crankshaft 17 adajacently above the mower blade 22 with its base in contact with the upper surface of the mower blade. In a preferred form of construction (as illustrated in FIGURES 2 and 3) the drive cone is secured directly to the mower blade by rivets 27. A driven cone 28, having its conical surface adapted for engagement with the drive cone 26, is positioned with its axis in radial relationship to the crankshaft 17. A tubular housing 29 extends laterally from the base of the driven cone 28 through an opening in the skirt 12 and projects exteriorly of the chassis 10. Opposite ends of the tubular housing are enlarged to respectively form inner and outer bearing sockets 30 and 31. A bracket 32, attached by bolts 33 to the outer surface of the skirt 12, is provided with an opening to accommodate the tubular housing 29 which extends therethrough and is also provided with lateral arms 34 projecting outwardly of the chassis 10 at opposite sides of the outer bearing socket 31. Opposed pivot pins 35 threadedly engage and project through the lateral arms 34 of the bracket 32 and the inner end of each pivot pin 35 is positioned within a corresponding detent in the outer surface of the outer bearing socket 31. Locking nuts 36 threadedly engage the pivot pins 35 and bear against the lateral arms to prevent displacement of the pivot pins. The outer race 37 of a ball bearing 38 is press fit within the outer bearing socket 31 and the inner race 39 of the ball bearing is coaxially secured to a horizontal shaft 40 projecting exteriorly of the bearing socket and extending inwardly through the tubular housing 29 to axial engagement with the driven cone 28. A ball bearing (FIGURE 6) is positioned and held within the inner bearing socket 30 and rotatably supports the horizontal shaft 40 therein. A U-shaped hanger 41 engages the tubular housing 29 at a location intermediate the bearing sockets 30 and 31 and opposite ends of the hanger are provided with aligned threaded openings. A nut 42, having its threaeded opening vertically disposed, is positioned adjacently between the ends of the hanger 41 and opposed pivot pins 43 projecting inwardly through the openings in the ends of the hanger engage detents in opposite walls of the nut 42.

A flanged collar 44 having a vertically disposed threaded opening therethrough is attached by screws to the upper surface of the plate 11 and is positioned in vertical alignment with the nut 42 pivotally fastened to the hanger 41, and an opening is provided through the plate 11 immediately beneath the collar. The threads in the opening through the collar 44 are formed oppositely to the threads of the nut 42, the former, for instance, being left hand threads and the latter being opposite or right hand threads. A doubly threaded rod 45, having left hand threads 46 on its upper portion and having right hand threads 47 thereunder, is adapted for simultaneous threaded engagement with the collar 44 and the nut 42. A knob 48 is secured to the upper end of the double threaded rod.

A hub 49 is secured to the outer end of the horizontal shaft 40 exteriorly of the chassis 10 and the outer bearing socket 31, and an edger blade 50 is attached to the hub by rivets 51. A fender 52 is attached to the plate 11 and extends circumferentially about the upper portion of the path of the outer edges of the edger blade 50.

The invention may be constructed as an integral accessory of a rotary type mower or may be attached to presently existing mowers by installation of the drive cone 26 on the mower shaft 17, attachment of the bracket 34 and flanged collar 44 to the mower's chassis at suitably formed openings therein, and attachment and adjustment of the tubular housing to the brackets. The inner bearing assembly, FIGURE 6, includes the referred to socket 30 and a ball bearing 53 therein for rotatably supporting the shaft 40. The shaft 40 is shouldered at 54 outwardly of the bearing 53 where it receives a washer 55. A tubular sleeve 56 having an outer circumferential flange 57 is mounted on the extending end of the shaft 40, and the inner end of which sleeve bears against the washer 55 when a nut 58 on the extending end of the shaft is tightened. Between the sleeve 56 and the axial opening of the driven cone 28 there is a tubular resilient element 59, the length of which is normally greater than the length of the axial opening through the driven cone 28. An annular groove 60 may be provided in the opening of the cone 28 for improved gripping action when the resilient tubular element 59 is compressed. The resilient element 59 not only serves as a shock absorber but also assures compressive contact of the driven cone 28 with the drive cone 26.

In operation, the knob 48 is rotated to engage or disengage the drive cone 26 and the driven cone 28. Rotary motion is imparted to the edger blade 50 through the horizontal shaft 40, and the driven cone 28 is held in positive engagement with the drive cone 26 by the doubly threaded rod 45 and hanger 41. Since resistance to rotation of the edger blade 50, as met in grass or soil during use of the edger attachment, is exerted principally at the lower part of the blade's path of revolution, stresses upon the shaft 40, pivot pins 35 and 42, and hanger 41 tend to accentuate frictional engagement between the drive cone 26 and the driven cone 28. When the edger is not in use, the knob 48 may be turned to disengage the cones 26 and 28; contact of one end of the edger blade 50 with the ground will cause it to rotate to a substantially horizontal position (as shown by dotted lines in FIGURE 1) where it will not hinder use of the mower.

The invention is not limited to the exemplary construction herein shown and described, but may be made in various ways within the scope of the appended claim.

What is claimed is:

In an edger attachment for a rotary type mower including a chassis having a depending drive shaft and rotary blade on the lower end thereof: a drive member attached to the drive shaft above said blade, a driven member engaging said drive member, a driven shaft extending laterally of said chassis operatively associated at one end with said driven member and disposed at right angles to said drive shaft, a bearing pivotally mounted and detachably secured to said chassis adjacent the periphery thereof for movement in a vertical plane of adjustment, said bearing receiving said driven shaft, an edger blade perpendicularly attached to and adjacent the other end of said driven shaft, a hanger on said chassis rotatably receiving said driven shaft intermediate said ends, adjusting means operatively associated with said driven shaft and said chassis for vertically moving said driven shaft whereby to determine the drive for said edger blade.

References Cited in the file of this patent
UNITED STATES PATENTS

| | | |
|---|---|---|
| 2,540,350 | Root | Feb. 6, 1951 |
| 2,552,583 | Phelps | May 15, 1951 |
| 2,707,858 | Norton et al. | May 10, 1955 |